United States Patent

[11] 3,600,634

[72] Inventor Charles A. Muench, Jr.
 Doraville, Ga.
[21] Appl. No. 885,485
[22] Filed Dec. 16, 1969
[45] Patented Aug. 17, 1971
[73] Assignee Integrated Systems, Inc.
 Norcross, Ga.

[54] PROTECTIVE CONTROL CIRCUIT AGAINST TRANSIENT VOLTAGES
 10 Claims, 2 Drawing Figs.
[52] U.S. Cl. ........................................ 317/16,
 317/44, 317/50, 317/51, 323/22 SC
[51] Int. Cl. ...................................... H02h 3/22
[50] Field of Search............................ 317/16, 50,
 51, 44, 11; 323/22 SC; 307/305; 321/45 DT

[56] References Cited
 UNITED STATES PATENTS
 2,538,177 1/1951 Vigren et al. .................. 317/16 X
 3,475,653 10/1969 Odenberg et al. ............. 317/33 X
 3,493,815 2/1970 Hurtle ........................... 317/33 X OTHER REFERENCES
" Triac Control for AC Power" a General Elective application note by E. K. Howell May 1964

Primary Examiner—J. D. Miller
Assistant Examiner—Harry E. Moose, Jr.
Attorney—James A. Hinkle ABSTRACT: A load protective circuit using a pair of solid state gate controlled AC switches, each connected from one side of a transmission line to ground in order to shunt the load terminals of the load from overvoltages. In the first embodiment, a firing control resistor connected between the gate terminal of the triac and ground determines the firing voltage to be presented to the gate terminal when a transient occurs on the transmission line and thereby renders the triac conductive if the firing voltage exceeds the triac threshold voltage. In the second embodiment, the firing control resistor is a variable potentiometer by which the firing voltage applied to the gate terminal of the triacs may be varied to vary the overall protection firing voltage.

PATENTED AUG 17 1971     3,600,634
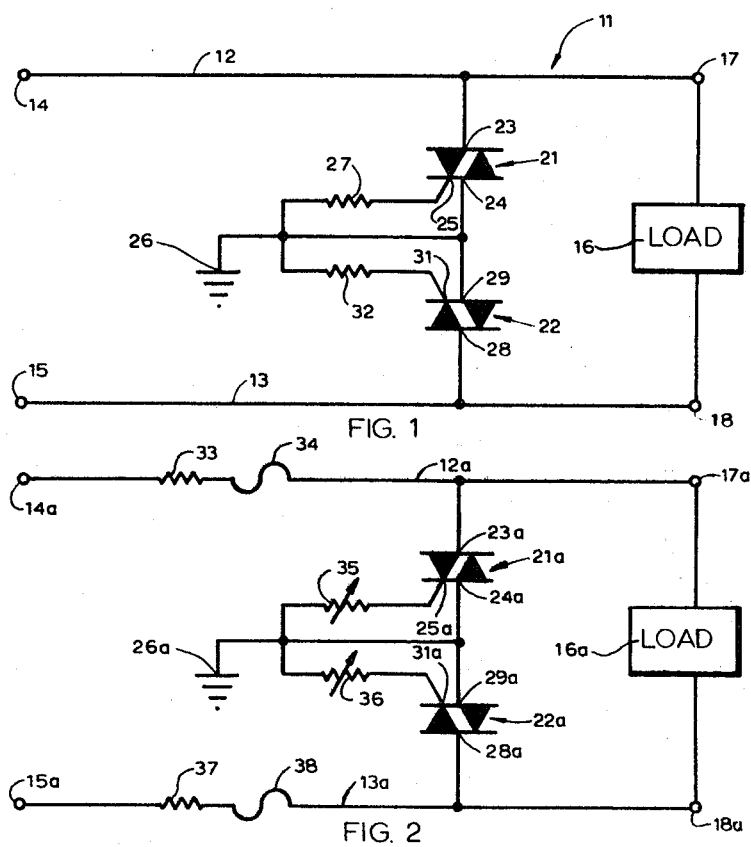
INVENTOR.
CHARLES A. MUENCH, JR.
BY James A. Hinkle
ATTORNEY

PROTECTIVE CONTROL CIRCUIT AGAINST TRANSIENT VOLTAGES

This invention pertains to voltage sensing circuits and more particularly relates to transient overvoltage responsive circuits of the kind adapted to shunt the transient overvoltage around a load which is to be protected.

It is oftentimes desirable or necessary to provide a circuit that senses the magnitude of an electric voltage and responds in a protective manner whenever the magnitude of the sensed voltage exceeds a predetermined value. Circuits of this kind are particularly adapted for use with expensive load components such as telephone equipment or delicate monitoring systems.

It has been known in the prior art to employ a fuse device to protect a load relative to an abnormal voltage supply condition, but expensive load components may not be adequately protected against an abnormal voltage condition by a fuse device because of similar breakdown type characteristics. The use of voltage sensitive relays by themselves to protect against under voltage as well as overvoltage conditions may not be adequate because of their relatively inaccurate mode of operation when compared to other precise electronic components.

For any one or more of well-known reasons, it is frequently advantageous to utilize solid state circuit components usually of the semiconductive kind for the protection against transient voltages. Such components give long useful service in most applications. Also, sensing circuits of the kind contemplated herein should be positive and decisive in operation, should be sensitive to brief transient disturbances ordinarily encountered, and should rapidly return to a state of continued readiness after making a response.

Accordingly, an object of this invention is to provide a transient overvoltage sensing circuit using solid state components and featuring operation that is positive and precise to thereby protect relatively expensive load components. The present protective circuit offers the advantages having relatively low cost and an exceptionally few number of components to create a protective circuit having a high degree of readiness and operational capabilities.

In brief, the circuit of the present invention comprises two triacs connected so that transient triac is positioned from one side of the line across a load to be protected and ground. The control terminal of each of the triacs is connected to ground through a firing control resistor. In a second embodiment of the invention, the firing control resistor is a variable potentiometer connected to each of the triacs to variably adjust the required voltage to fire the triac to ground. The circuit of the present invention will protect any desired expensive load connected to the load terminal of the circuit from voltage transient which occur between the transmission line and ground. The circuit works on the principle that when either of the line voltage on the input side exceed a preset value a determined by the triacs and the associated firing control resistor the triac will conduct and force the voltage across the load to drop to a nominal value, thus the transient voltage is dissipated over the line impedance to ground.

The concept of utilizing solid state triacs having a pair of power terminals and a control terminal provides a device which will conduct alternating current between the power terminals when a gating signal is applied to the control terminal. The triac conducts easily once it has been triggered, and there is little dissipation across the triac which provides for a greatly increased life of the triac. At the present time, triacs are available having 60 ampere continuous rating and having a urge rating of well in excess of 1,000 amperes. Other transient protective device commonly used in the art do not have the current capability of the triac. The triac also has an advantage of being able to adjust the firing voltage from approximately one volt to the maximum breakdown rating of the unit so that any desired firing voltage may be set into the triac depending upon its customized installation. The unit is also bilateral in that it can conduct both positive and negative surges and is self-restoring so that it returns to a nonconductive state every time the transient voltage goes to essentially zero.

Further aims, objects and advantages of this invention will appear from a consideration of the following description and the accompanying drawings showing for purely illustrative purposes embodiments of this invention. Referring to the drawings:

FIG. 1 is a schematic circuit of a first embodiment of the present invention; and FIG. 2 is a schematic circuit representation of a second embodiment of the invention.

Referring to the drawings wherein like reference characters designate corresponding parts through the several figures, the embodiment of the invention disclosed in FIG. 1 and illustrated by circuit 11 comprises transmission lines 12 and 13 having respective input terminals 14 and 15. A suitable load 16, which is to be protected, is shown connected across transmission lines 12 and 13 at load terminals 17 and 18.

As one contemplated use of the invention is to protect load equipment on telephone transmission lines, it may be assumed for illustrative purposes that the transmission lines 12 and 13 represent one pair of lines, and that each of the lines represent one side of the pair.

To protect the load 16, each of the transmission lines 12 and 13 have connected across the load, between the line and ground, a solid state gate controlled AC switch, or as previously noted the switch is a type known as a "triac," represented by numeral 21 for the triac connected to transmission line 12 and by numeral 22 for the triac connected to transmission line 13. Triac 21 has a power terminal 23 connected to the transmission line 12 and a power terminal 24 connected to ground 26. A gate terminal 25 is also connected to ground 26 through a firing control resistor 27.

In a similar manner, triac 22 has a power terminal 28 connected to transmission line 13 and a power terminal 29 connected to the ground 26. The gate terminal of triac 22 is connected to the ground 26 through a firing control resistor 32.

Basically, these triac switches 21 and 22 are of such a construction that when a suitable biasing current signal is applied to the gate electrode, either 25 or 31 depending upon the particular triac, the triac will be triggered into a conducting state in which alternating current will flow between power terminals 23 and 24 for triac 21 or power terminals 28 and 29 for triac 22. This is, of course, providing that there is a voltage of either polarity greater than the threshold value as set for the particular triac to commence conducting.

The present invention effectively utilizes the triacs as variable breakdown devices under the control of a potential applied through the firing control resistor across one power terminal and a gate electrode. It is well known that triacs are essentially current sensing devices which are rendered conducting when a predetermined current is supplied at the gate terminal. As it is desired to protect the load 16 from a surge of transient voltages on the transmission lines 12 and 13, the firing control resistors 27 or 32 are connected to the respective gate terminals of the triacs 25 or 31 with a resistance value to determine effectively the voltage threshold at which the triacs will conduct. By utilizing Ohm's law of $V = RI$ where V is a firing voltage desired in the triac, R is the value of the resistance of the firing control resistors 27 or 32 and I is the fixed firing current of the triacs, it is possible to relate the conducting state of the triacs to a particular minimum threshold voltage needed upon the transmission lines to cause the triacs to become conductive. As examples of common types of triacs which are effective in such an application as herein described it has been found that Motorola Model Number triacs MAC 36–4 and MAC 2–3 have been found to be particularly effective.

Therefore, with a common type of triac rated at a continuous rating of 8 amperes, for example, Motorola Model Number MAC 2–3, the firing control resistor selected at 10,000 ohms the triac would then have a threshold firing voltage of approximately 80 volts. Consequently, any time a voltage appearing across either triac exceeded the threshold voltage of 80 volts, there would be sufficient biasing current through the firing control resistor to the gate terminal to cause the triac to become conducting and consequently to shunt harmful transient voltages around load 16 to ground 26.

For a triac such as given in the example above, which is rated at a continuous 8 amperes, the maximum current rating might well be 100 amperes and such a triac could protect the load 16 against transient voltages of the magnitude of 34,000 volts for 1½ milliseconds if the transmission line has an assumed impedance of 150 ohms. As transient voltages are of very short duration, such a protection would be quite sufficient if the desired protection limits corresponded to this particular protection value. Due to the length of the normal transmission line 12—13, there is usually not a need for a current limiting resistor and fuse arrangement across the load; however, such could be provided if desired.

As an example of the operation of this circuit, assume a transient voltage surge occurs on transmission line 12 which causes a particular voltage differential across triac 21 with respect to ground 26. A biasing control current will then be present across firing control resistor 27 to gate terminal 25 and, depending upon the value selected for resistor 27, this biasing control current may not exceed the predetermined firing voltage of the triac. Should the threshold voltage of the triac be exceeded, the triac 21 will then be rendered conductive by the biasing control current at the gate terminal 25 and the transient voltage on transmission line 12 will be shunted to ground 26 thereby protecting the load 16. The triac 21 will then remain conducting until the voltage reaches essentially zero at which time the biasing current to gate terminal 25 will be reduced and the triac 21 will then return to its nonconducting state.

In order to fully protect the load 16, it is also desired to have triac 22 protect the other side 13 of the pair of transmission lines and triac 22 operates in the same manner as triac 21. Should a transient voltage appear upon line 13, there would be a potential difference across triac 22 with respect to ground 26. The firing voltage of triac 22, as determined by the firing control resistor 32, would be exceeded if the biasing control current to the gate terminal 31 exceeds the threshold firing voltage of the triac. If such occurs, then the triac would be rendered conductive and the transient overvoltage would be shunted to ground 26 in the same manner as described for triac 21.

Should, for some reason, transient overvoltage occur simultaneously on both transmission lines 12 and 13, then triacs 21 and 22 would operate independently of one another; and, as described above for the independent operation of the triacs, the simultaneous transient overvoltage on each transmission line would be shunted independently to ground 26 with no harm occuring to load 16.

Referring now to FIG. 2 which shows the second embodiment of this invention, the input terminals 14a, 15a are connected respectively to transmission lines 12a and 13a which have respective load terminals 17a and 18a. Across these load terminals is a suitable load 16a that is to be protected by the present circuit. To protect the load 16a, each of the transmission lines have a protective circuit essentially as described in FIG. 1.

In addition, it may be desirable to dissipate high currents within the transmission lines in order to more adequately protect the load and the protective circuits. To this end, should the situation dictate, provisions have been made for a suitable current limiting resistor impedance 33 and a suitable fuse 34 to be included in transmission line 12a. The current limiting resistor 33 and fuse 34 may be included within the transmission line 12a to accomplish their normal function, i.e., to limit the current on transmission line 12a and to protect the line and the down line components with a fuse should the currents become excessive. However, in the normal operation of a transmission line normally associated with telephone equipment, there are long lines over which high currents may be dissipated normally and since the force is normally of short duration, the impedance of a normal transmission line will adequately dissipate the high surge currents and the current limiting resistors and fuses most likely will not be necessary.

To protect the load 16a on the transmission line 12a there is connected between transmission line 12a and ground 26a a protective circuit including a triac 21a having power terminals 23a, 24a and a gate terminal 25a. The triac 21a is connected between transmission line 12a and ground 26a through power terminals 23a and 24a; however, gate terminal 25a is connected to ground through a variable firing control potentiometer 35.

In a like manner, the load is protected from transmission line 13a by triac 22a which is connected from the line to ground 26a through power terminals 28a and 29a. The gate terminal 31a of this triac is connected to ground through the variable firing control potentiometer 36. Transmission line 13a in the same manner as transmission line 12a may or may not, as the situation demands, have additional protection in the form of a current limiting resistance 37 and a fuse 38.

The embodiment as disclosed in FIG. 2 operates in the same manner as described for FIG. 1 above with the exception of the variable firing control potentiometers 35 and 36 which present an operator of the circuit means by which the biasing control current present across the variable potentiometers may be selected to change the voltage applied to the triac 21a or 22a, as the case may be, in order to make the circuit adaptable to triacs having various predetermined firing voltages. In other respects, the operation of this circuit is the same as FIG. 1 in that whenever the threshold voltage of the triac is exceeded the triac will be rendered conductive by the biasing control current at the gate terminal and the transient voltage on the transmission line will be shunted to ground 26a thereby protecting the load 16a. The triac will then remain conducting until the voltage reaches essentially zero at which time the biasing current at the gate terminal will be reduced and the triac will then return to its nonconducting state. As in the case of the embodiment of FIG. 1, one or both triacs 21a, 22a may operate independently or concurrently with one another to protect the load 16a.

As an example of the operation of the circuit shown in FIG. 2 the following fixed value components were utilized: R33–100 ohms, 25 watts; triac 21a–Motorola MAC 36–4, 25 amps r.m.s.; R35 comprised variable resistances as noted below. With the above components the following results were obtained and observed during actual tests and the breakdown of the triac 21a was recorded upon an oscilloscope connected across the triac:

| Value of R35, K ohms: | Breakdown of triac 21a,[1] volts RMS |
|---|---|
| 1 | 3.5 |
| 9.1 | 26 |
| 13 | 39 |
| 18 | 55 |
| 24 | 76 |

[1] Gate fires to ground 26.

When a variable voltage was applied to terminal 14a to simulate actual operating conditions the triac experienced a breakdown and fired to ground through the gate electrode at the above listed voltages corresponding with the particular value of R35 as shown.

The above description of the embodiments of FIG. 1 and FIG. 2 has disclosed a novel protective circuit to protect expensive loads easily damaged by line transients. This circuit is not known in the prior art. The circuit is inexpensive and provides an exceptional degree of protection to a load which could easily be rendered inoperative by a mere fleeting transient voltage upon the transmission line.

What I claim is:

1. An overvoltage protective circuit having a load to be protected which is connected across a pair of transmission line leads comprising: a first solid-state gate controlled AC switch connected in shunt relation relative to the load from a first transmission line lead to ground, a second solid-state gate controlled AC switch connected in shunt relation relative to the load from a second transmission line lead to ground, each switch having a first power terminal connected to the respective transmission line and a second power terminal connected to ground, each switch further having a firing control circuit connected from the gate to the second power terminal for determining times at which the switch will be rendered conductive based upon the magnitude of the overvoltage on the transmission line appearing across the power terminals of the switch, whereby when an overvoltage is present on at least one of the transmission lines the firing control circuit of the respective switch senses the overvoltage and renders the respective switch conductive upon the predetermined firing voltage of the switch being exceeded.

2. The overvoltage protective circuit of claim 1 wherein the firing control circuit comprises a sensing element to sense the presence of an overvoltage on the transmission line.

3. The overvoltage protective circuit of claim 2 wherein the sensing element upon sensing an overvoltage is adapted to cause a biasing control signal to be applied to the gate of the switch, the value of the biasing control signal relative to the magnitude of the overvoltage to thereby render the switch conductive upon the firing voltage of the switch being exceeded.

4. The overvoltage protective circuit of claim 3 wherein the sensing element is a resistance.

5. The overvoltage protective circuit of claim 3 wherein the sensing element is a variable resistance.

6. An overvoltage protective circuit having a load to be protected which is connected across at least one transmission line lead and ground comprising a solid-state gate controlled AC switch connected in shunt relation relative to the load from the transmission line lead to ground, the switch having a first power terminal connected to the respective transmission line and a second power terminal connected to ground, the switch further having a firing control circuit connected from the gate to the second power terminal for determining times at which the switch will be rendered conductive based upon the magnitude of the overvoltage on the transmission line appearing across the power terminals of the switch, whereby when an overvoltage is present on the transmission line the firing control circuit of the switch senses the overvoltage and renders the switch conductive upon the predetermined firing voltage of the switch being exceeded.

7. The overvoltage protective circuit of claim 6 wherein the firing control circuit comprises a sensing element to sense the presence of an overvoltage on the transmission line.

8. The overvoltage protective circuit of claim 7 wherein the sensing element upon sensing an overvoltage is adapted to cause a biasing control signal to be applied to the gate of the switch, the value of the biasing control signal being relative to the magnitude of the overvoltage to thereby render the switch conductive upon the firing voltage of the switch being exceeded.

9. The overvoltage protective circuit of claim 8 wherein the sensing element is a resistance.

10. The overvoltage protective circuit of claim 8 wherein the sensing element is a variable resistance.